March 1, 1932.  V. LENTINI  1,847,219
GARMENT MEASURING DEVICE
Filed Feb. 18, 1931  4 Sheets-Sheet 2
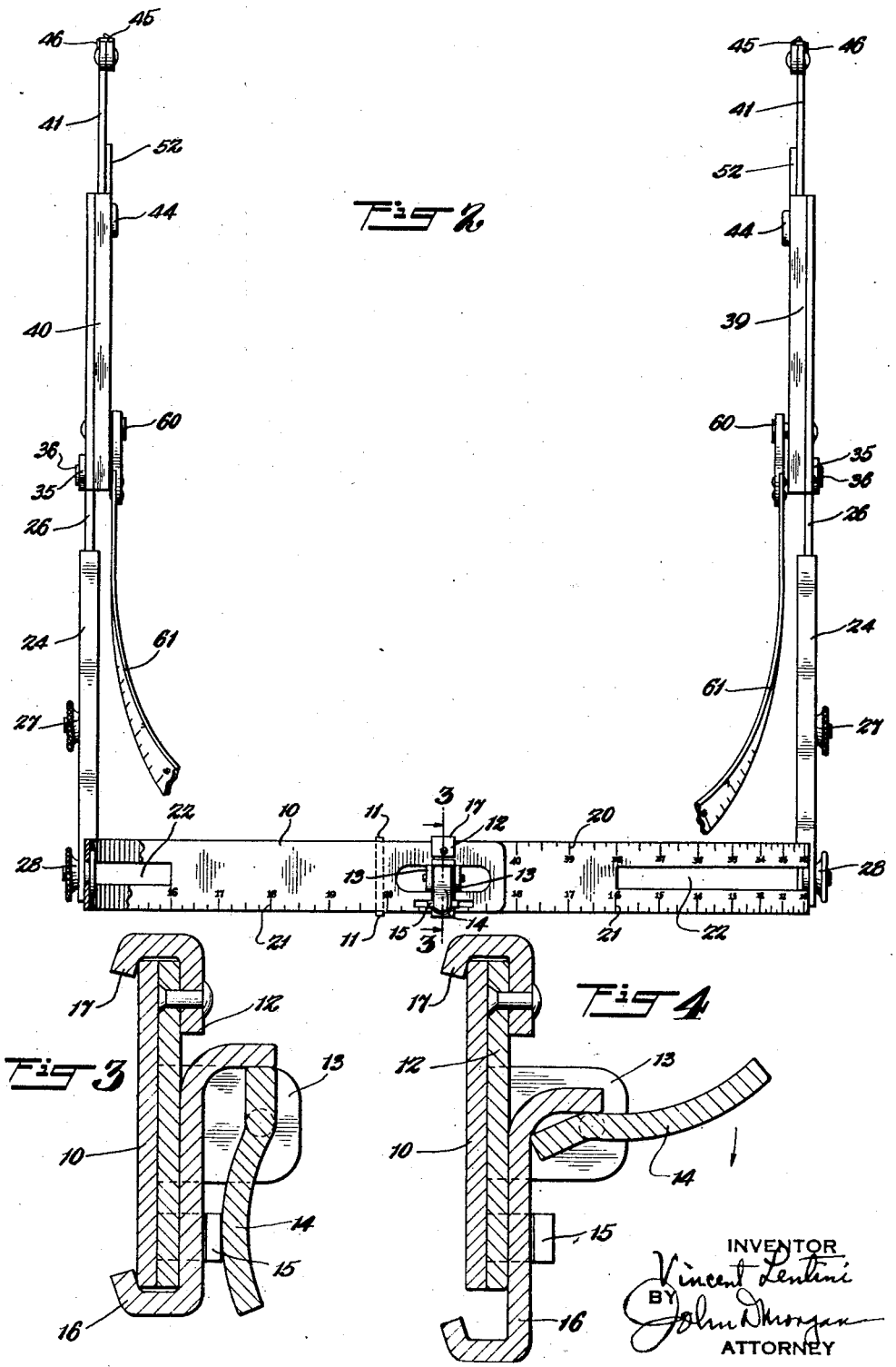
INVENTOR
Vincent Lentini
BY John D Morgan
ATTORNEY

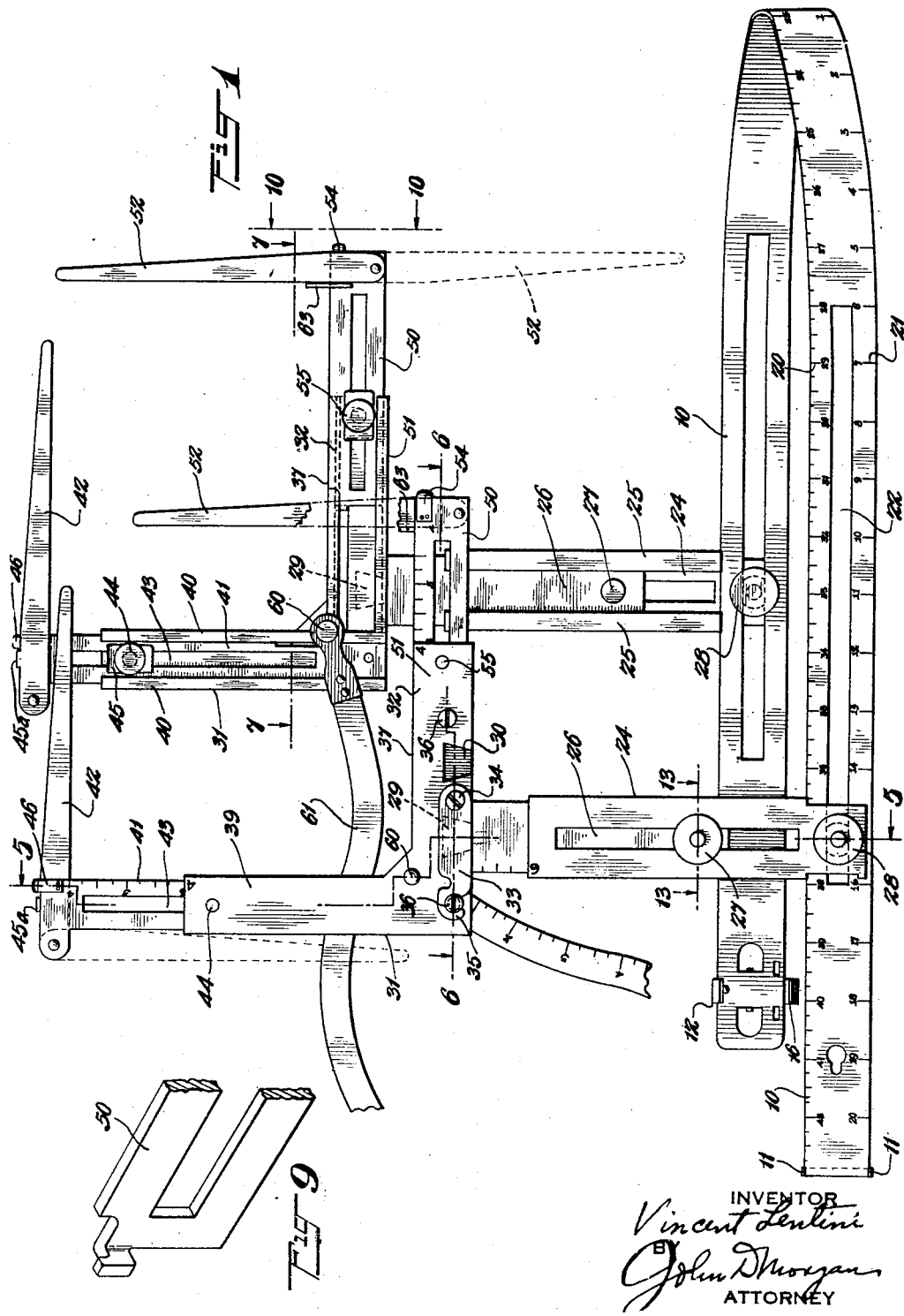

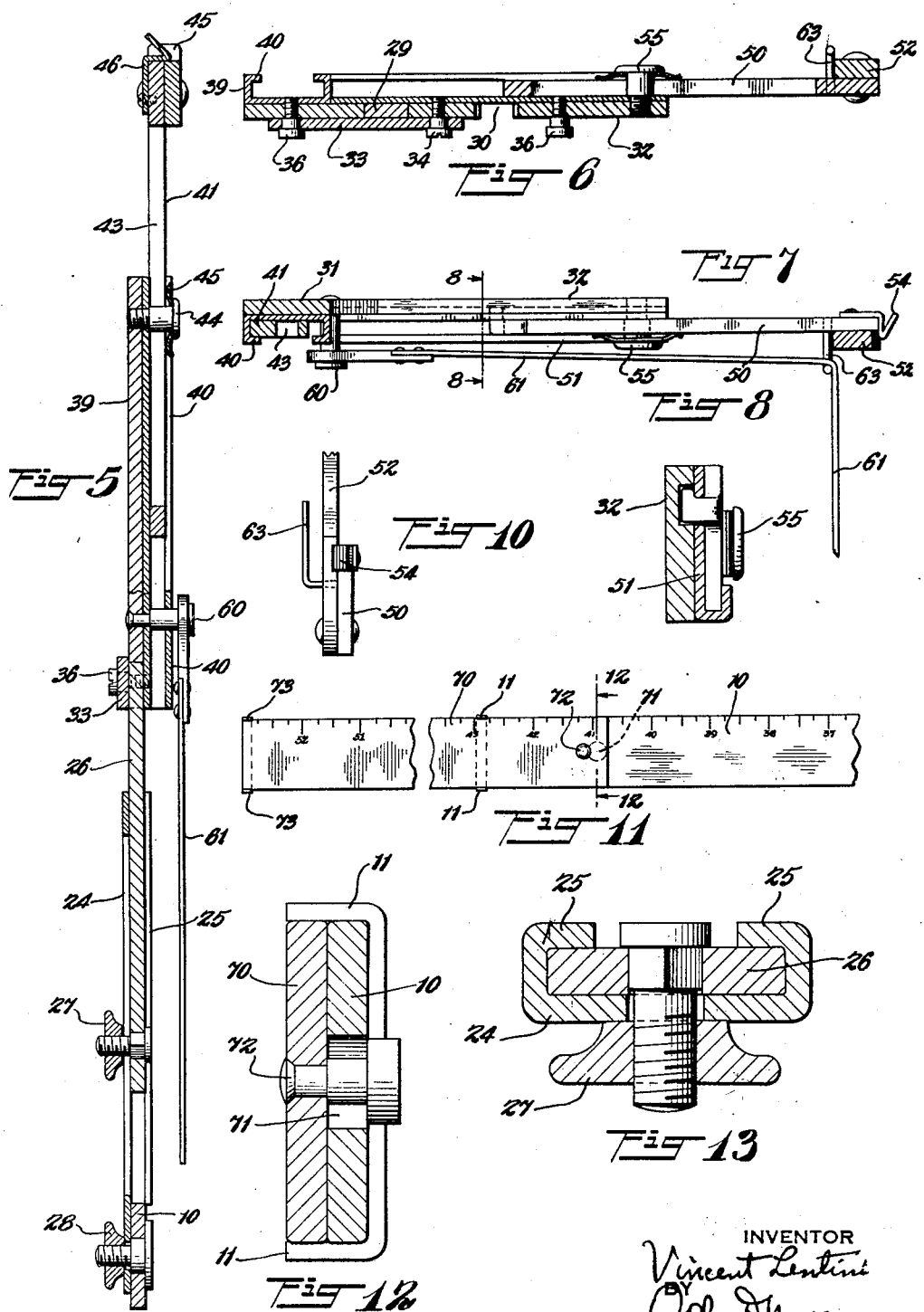

March 1, 1932. V. LENTINI 1,847,219
GARMENT MEASURING DEVICE
Filed Feb. 18, 1931   4 Sheets-Sheet 4
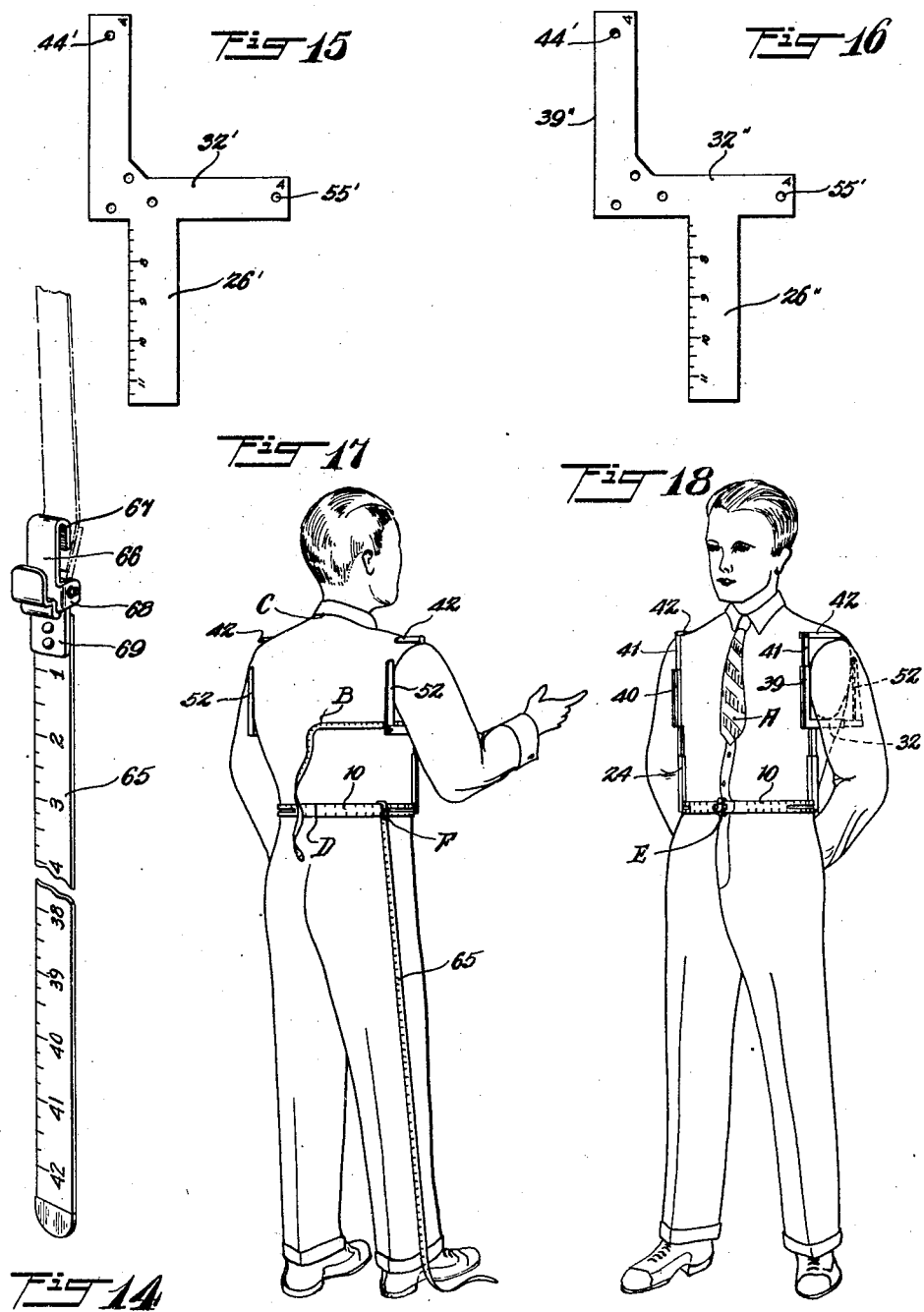

Patented Mar. 1, 1932

1,847,219

UNITED STATES PATENT OFFICE

VINCENT LENTINI, OF NEW YORK, N. Y.

GARMENT MEASURING DEVICE

Application filed February 18, 1931. Serial No. 516,645.

The present invention relates to a garment measuring device and more particularly to a measuring device which facilitates and insures accuracy in the measurement of a person for garments.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Figure 1 is a side elevation of the present preferred embodiment of the invention, with certain parts broken away;

Figure 2 is a front elevation of the embodiment shown in Figure 1, with certain parts broken away;

Figure 3 is a detail vertical section, taken on the line 3—3 of Figure 2;

Figure 4 is a similar section, showing the clamping members in non-clamping position;

Figure 5 is a vertical section taken on the line 5—5 of Figure 1;

Figure 6 is a horizontal section taken on the line 6—6 of Figure 1;

Figure 7 is a horizontal section taken on the line 7—7 of Figure 1;

Figure 8 is a detail section taken on the line 8—8 of Figure 7;

Figure 9 is a detailed fragmentary perspective view of a member shown in Figures 7 and 8;

Figure 10 is a detailed, fragmentary elevation as viewed from the line 10—10 in Figure 1;

Figure 11 is a fragmentary front elevation of the waist-encircling member of Figure 1, with an extension in use;

Figure 12 is a detailed vertical section taken on the line 12—12 of Figure 11;

Figure 13 is a detailed section taken on the line 13—13 of Figure 1;

Figure 14 is a perspective view of a measuring tape for use with the present embodiment of the invention;

Figures 15 and 16 are front elevations of a modified embodiment of one part of the present invention;

Figures 17 and 18 are views showing the preferred embodiment of the invention in use.

The present invention has for its object the provision of a measuring device facilitating the measurement of a person's body preparatory to the manufacture of tailor-made garments. A further object is the provision of such a measuring device which will insure accuracy in determining all the necessary measurements. Still another object is the provision of such a device which can be easily manipulated in actual practice and relates all the measured points to a single base or line.

In accordance with the present preferred and illustrative embodiment of the invention, a waist-encircling member is provided, which conforms to the normal waist line of the person being measured, and this member supports a plurality of additional, variably positionable measuring devices to determine the positions of all the points necessary to be determined relative to the waist line. While these additional devices are capable of wide horizontal and vertical movement to measure persons of widely varying size, the devices are so supported on the waist-encircling member that they are always held in either parallel or perpendicular relation to the waist-encircling member, thereby giving the perpendicular distance between the points measured and avoiding the errors which might otherwise occur.

It will be understood that the foregoing general description and the following detailed description as well, are exemplary and explanatory of the invention, but are not restrictive thereof.

The waist-encircling member, which serves as a base line to which all the subsequent measurements are referred, comprises a relatively thin and wide, flexible, resilient strap 10, preferably formed of thin spring steel which readily conforms to the shape of the body, but is substantially rigid width-wise of the strap, thereby holding the member in a single plane. The ends of the waist-encircling member are adapted to be brought together and fastened in overlapping relation at the front of the person being measured, the extent of the overlapping depending on the waistline of the person. For holding the member in place with the end portions in alinement, one end is provided with a pair of small struck-up ears 11 which engage the side edges of the strap-like member near its other end, while this other end is provided with a suitable clamp 12 by which it may be fastened to hold the member in adjusted position tightly about the waist. As embodied, the clamp 12 is formed integral with the member 10 and comprises a pair of punched-out, bent up lugs 13 extending outwardly from the member and carrying a pivoted lever 14. Guide lugs 15 are also formed adjacent to the lugs 13 and form a guide for the sliding clamp 16 which can be closed to clamp the member 10 between it and the stationary clamp 17. Figure 3 of the drawings shows the clamp in locked position, while Figure 4 shows the clamp in opened position.

The waist-encircling member is also provided with graduations and as embodied, the graduations 20 extend from one end of the waist-encircling member 10 throughout the length of the member, for measuring the waist-line of the person. Additional graduations 21 are provided, extending in both directions from the middle point of the member, to be placed at the middle of the person's back.

Between the mid-point of the member and its ends, the waist-line member is provided with narrow longitudinally-extending slots 22 to be positioned at the sides of the person, and the slots are of sufficient length so the slot will be directly beneath the arm pits on persons of different sizes.

When the waist-line member is correctly positioned, it conforms to the person's normal waist line, the front and back portions are spaced the same distance from the floor while the right and left sides, in a normal person, are level. In case of abnormalities, as are often present, the member will be slightly inclined from side to side, due to uneven height of the hips.

For measuring the height of the arms at the shoulders from the waist line, a pair of upright members are provided which are slidable forwardly and rearwardly and supported on the waist-line member 10 and are maintained always perpendicular to the waist-line member. As embodied, these arm-height measuring members are similar to each other, and only one will be described. Each comprises an upright strip 24 having its side edges 25 turned over to provide a slideway in which slides a short scale member 26 projecting upwardly from the end of the slideway and secured therein at the desired height by means of the set-screw 27. The uprights 24 are mounted on the waist-line member 10 and are secured at either side of the person to be measured by means of the set screws 28, which can be tightened to firmly hold the uprights directly beneath the arm pits of the person being measured. For maintaining the uprights perpendicular to the waist line member, the side edges 25 are cut away and contact with the upper edge of the waist-line member 10. The front edge of the uprights cooperate with the scales 20 and 21 on the waist line member 10 to indicate the blade measurement of the person.

For measuring the vertical height and horizontal thickness of the arms at the shoulders, a generally rectangular frame 31, having variably positionable sides, is provided and mounted at the extreme upper ends of each of the upright scales 26. The sides of the rectangular frames are always maintained either perpendicular or parallel to the waist line member 10, while measuring.

As embodied, the upper end of each scale member is provided with a dove-tail 29 which fits into either of the corresponding recesses 30 in the lower side of the right-angled member 32, and is maintained therein by means of a plate 33. Plate 33 is pivotally mounted on screw 34 and is provided with a hooked end 35 which cooperates with either of screws 36 to hold the dove-tail 29 securely within either recess 30.

In measuring arm-height, the upper horizontal edge 37 of the right-angled member 32 is moved upwardly until it contacts with the arm pit and is held in that position by tightening the set screw 27.

The front or upright portion 39 of the right angled member 32 is then moved into contact with the front side of the arm at the shoulder and is held in contact therewith by tightening set screw 28, thereby giving the blade measurement and relating these points accurately to the waist line.

The upright portion 39 of the right angled member is provided with a slideway, formed by the bent over edges 40 of the upright, and in this slides a scale member 41 carrying at its upper end a pivoted finger 42 which can be swung horizontally to lie on the upper portion of the arm at the person's shoulder. Scale 41 is slotted, as at 43, to receive the screw 44 provided with a spring washer 45 to frictionally hold scale 41 and finger 42 in any desired vertical position. Finger 42 is provided with a small ear 45a which engages the top of the scale to hold finger 42 perpendicular to scale 41 and parallel to the waist-line member 10. Scale 41 also carries a small angled latching spring 46 which serves to securely hold the finger in its parallel position while measuring, thereby preventing its inadvertant displacement, which would result in inaccurate measurement.

For measuring the thickness of the arm at the shoulder, a generally similar scale 50 is provided and is slidably mounted in the slideway formed in the horizontal portion 51 of the right angled member 32 and is provided with a finger 52 to engage the rear portion of the arm at the shoulder. Scales 51 are also provided with a finger latching spring 54, and are slotted to receive the spring-washer holding screw 55.

After the right angled member has been moved into contact with the front and under side of the arm at the shoulder, fingers 42 are swung into measuring position and are lowered onto the upper portion of the arms at the shoulder by lowering scale members 41 giving the shoulder height. Fingers 52 are then swung into their upwardly-extending position and moved against the rear of the arms at the shoulder, by movement of scale 50, to give the shoulder thickness or scales. With the parts in this position, prominence of the stomach may be obtained by reading the position of the uprights 24 on the waist line member 10, compensating, if necessary for the use of the rearmost recess 30 instead of the forward recess. The arm height is then taken by reading the scale 26 at the top of the upright 24; the thickness of the arm is read on scale 50 at the end of the horizontal portion 51 of right angled member 32; and, the height of the shoulder is found by reading the scale 41 at the top of the right angled member 39.

Means are also provided for taking the other measurements about the upper part of the body, and as embodied measuring tapes are provided and are each swiveled substantially at the intersections 60 of the upper and rear edges of the right-angled members 32. These tapes 61 may be moved downwardly to measure the arm length, may be stretched forwardly around the chest to obtain the position of the center of the breast A, or may be pulled rearwardly to the center of the back B to give the blade measurement. By passing the tape over the shoulder and to the center of the back B, the over-shoulder measure is taken accurately, and another measurement is taken by drawing the tape to the center of the collar C.

Means are also provided for accurately finding the square width of the back, and, as embodied, small wire hooks 63 are provided near the rear end of each scale 50, alined with the front edge of the rear fingers 52. By passing either of the tapes 61 rearwardly, through both hooks 63 and over to the point 60 where the other tape is swivelled, as shown in Fig. 7, the square width of the back is found.

The scye depth and the height of the center of the collar are obtained by attaching a tape to the center back of the waist-line member 10 and drawing the measuring tape directly upwardly to the center of the collar C. The difference between the height of the collar center C and the center of the back B gives the scye depth and the scye depth added to the height of the center back should equal the height of the center collar.

The present invention also facilitates the measurement of the trousers, and with the waist-line member 10 still in its correct position, with its front and back portions the same distance from the floor, but with the right and left sides conforming to the irregularities of the person, if any, the tape measure 65, shown in Fig. 14, is hooked over the center back portion D of the waist-line member, and is passed forwardly and upwardly through the crotch and to the front center E of the waist-line member 10. The tape may then be hooked over the waist-line member at the sides F of the hips, and by measuring downwardly, the trouser length is obtained. The inside trouser length may also be obtained by measuring from the lowest point of the tape, while in crotch-measuring position, to the bottom of the trousers or the floor, as desired.

In order to facilitate these measurements, the end of the tape is provided with a hook 66, having a loop 67 of substantially the same size as the width of the waist line member, and in the parallel lugs 68 on the side of the hook is pivoted a metal plate 69 attached to the end of the tape 65.

In order to increase the range of sizes which can be measured by the waist-encircling member, an extension is provided which can be used, when necessary. As shown in Fig. 11, the extension comprises a short flexible, strap-like member 70, of the same width and material as the waist-line member 10. One end of the waist-line member is provided with a key-hole slot 71, having its narrow end nearest the end of the member 70, into which fits the small stud 72 provided with an enlarged head and secured near one end of the member 70. At its other end, member 70 is provided with ears 73 which engage the sides of the waist line member 10 and cooperate with the clamp and ears 11 to hold the members 10 and 70 in alinement.

Figures 15 and 16 of the drawings show a modified form of the right-angled member to be engaged with the arm at the shoulder. In accordance with this modification, a pair of right angled members are provided for each side of the person, to replace the right-angled members 32. As shown in Figure 15, an upright scale member 26' is provided which is formed integral with the right angled-portion 32', the scale member being adapted to fit within the slideway formed in the upright 24. The right angled member 32' is provided with threaded holes 44' and 55' into which may be screwed the screws 44' and 55' for frictionally holding the scales 41 and 51 in the desired position. The other right-angled member 32'', shown in Figure 16, is substantially similar to that shown in Figure 15, except that the vertical portion 39'' for contacting with the front of the arm at the shoulder is offset from the upright scale portion 26'', and is to be used when the shoulders are positioned abnormally forward.

The invention in its broader aspects is not limited to the specific mechanisms shown and described but departures may be made therefrom within the scope of the accompanying claims without departing from the principles of the invention and without sacrificing its chief advantages.

What I claim is:

1. A garment measuring device including in combination a thin resilient member to encircle and conform to the waist line of the person being measured, a pair of perpendicular standards movable horizontally on said resilient member, scales slidable in said standards and movable into engagement with the arm-pits to measure their height from the waist line, right-angled portions carried at the upper ends of the scales, each right-angled portion being equipped with a pair of scales, one movable vertically and the other horizontally, fingers pivoted at the ends of the last named scales, said scales and fingers being relatively variably positionable to abut the arms at the shoulders, the standards, scales and fingers being parallel or perpendicular to said waist line member.

2. A garment measuring device including in combination a thin resilient member to encircle and conform to the waist line of the person being measured, a pair of perpendicular standards movable horizontally on said resilient member, scales slidable in said standards and movable into engagement with the arm-pits to measure their height from the waist line, right-angled portions carried at the upper ends of the scales, each right-angled portion being equipped with a pair of scales, one movable vertically and the other horizontally, fingers pivoted at the ends of the last named scales, said scales and fingers being relatively variably positionable to abut the arms at the shoulders, a flexible measuring tape fastened on the right-angled members and in line with the front of one arm at the shoulders, and guides on one of the scales over which said tape may be guided in line with the rear side of the shoulders to give the square width of the back, the standards, scales and fingers being parallel or perpendicular to said waist line member.

In testimony whereof, I have signed my name to this specification.

VINCENT LENTINI.